Nov. 18, 1941.    T. N. ROSSER    2,262,819
BATTERY OPERATED POWER SUPPLY CIRCUITS
Filed Oct. 10, 1939
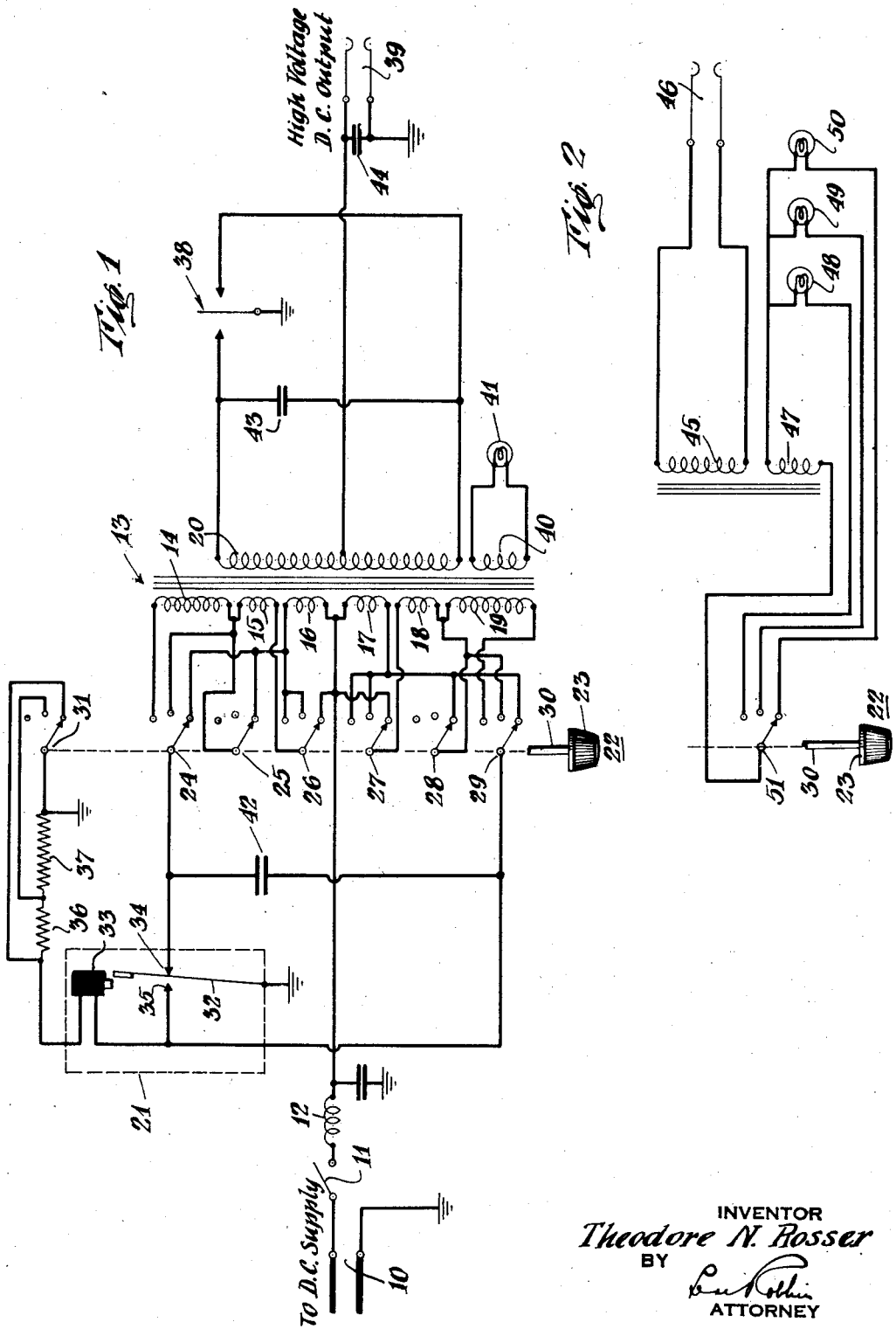
INVENTOR
*Theodore N. Rosser*
BY
ATTORNEY Patented Nov. 18, 1941

2,262,819

UNITED STATES PATENT OFFICE 2,262,819

BATTERY OPERATED POWER SUPPLY CIRCUITS

Theodore N. Rosser, Indianapolis, Ind., assignor to P. R. Mallory & Co., Inc., Indianapolis, Ind., a corporation of Delaware Application October 10, 1939, Serial No. 298,826

4 Claims. (Cl. 175—365)

This invention relates to battery operated power supply circuits particularly of the type utilizing an electro-magnetic vibrator in combination with a transformer for obtaining a high voltage output from a battery of lower voltage.

An object of the invention is to improve such circuits.

Another object of the invention is to adapt such circuits to operation on a predetermined plurality of battery voltages.

Other objects of the invention will be apparent from the following description and accompanying drawing taken in connection with the appended claims.

The invention comprises the features of constructions, combination of elements, arrangement of parts, and methods of manufacture and operation referred to above or which will be brought out and exemplified in the disclosure hereinafter set forth, including the illustrations in the drawing.

In the drawing:

Figure 1 is a circuit diagram of a battery operated power supply circuit embodying features of the present invention; and Figure 2 illustrates certain modifications of part of the circuit.

A feature of the present invention whereby the above objects are achieved resides in the use of a transformer primary winding divided into a plurality of sections and a switch for connecting certain of said sections in series or in parallel to render the transformer adapted to operation on different battery voltages. Another feature resides in the combination with an electromagnetic vibrator of impedance means and switch means to variously connect the impedance means in the vibrator circuit to adapt the vibrator to operation at various voltages. Other features of the invention will be made evident in the following detailed description.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring to Figure 1 of the drawing the circuit comprises a suitable plug 10 having 2 contacts, one of which is grounded and the other of which is connected through switch 11 with the vibrator-transformer circuits. Plug 10 is adapted to be plugged into suitable sockets comprising outlets of D. C. or battery supplied power sources. In the circuit shown the power sources are assumed to supply six volts, twelve volts or thirty-two volts.

The ungrounded side of the D. C. supply is connected through plug 10, switch 11 and choke coil 12 with the center tap of the primary winding of transformer 13. The primary winding comprises 6 sections, namely, sections 14, 15, 16, 17, 18 and 19 and hence the D. C. supply is connected between section 16 and 17. Transformer 13 is provided with a center tapped secondary winding 20 inductively associated with all of the sections of the primary winding.

Associated with the primary winding is an electromagnetic vibrator 21 enclosed in a suitable casing indicated by the dotted lines and a multi-position gang type switch 22 comprising a control knob 23 for rotating control shaft 30 controlling a plurality of switch sections 24, 25, 26, 27, 28, 29 and 31.

The switch sections 24 to 29 inclusive and 31 each comprise a rotatable switch contact co-operating with three stationary contacts which may be selected at the will of the operator by turning knob 23.

The electromagnetic vibrator 21 comprises a vibrator reed 32, vibrated by an electromagnet 33 upon suitable energization from the D. C. supply. Reed 32 co-operates with stationary contacts 34 and 35 mounted on opposite sides of the reed respectively whereby the reed in its vibration first engages one of the stationary contacts and then the other alternately. Contact 35 is engaged by the reed when the reed is attracted by electromagnet 33 and contact 34 is engaged by the reed on its return swing. The reed itself is grounded. Contact 34 is connected to the movable contact of switch section 24. Contact 35 and one terminal of electromagnet 33 are both connected to the movable contact of switch section 29. The other terminal of electromagnet 33 is connected through resistances 36 and 37 to ground.

Switch section 31 in the position shown short-circuits resistances 36 and 37. In the center setting for the movable contact of section 31 resistance 37 only is short-circuited and in the remaining position neither resistance is shorted out.

In the switch position shown it will be noted that transformer primary winding sections 15 and 16 are connected in parallel to vibrator contact 34 as follows: For winding section 16 from the center tap which is connected to D. C. supply through winding 16 and the contacts of switch section 24 to vibrator contact 34. For winding 15 from the D. C. supply through contacts of switch section 26 through winding 15, contacts of switch section 25, contacts of switch section 24 to contact 34.

Primary winding sections 17 and 18 are similarly connected in parallel to contact 35 by switch sections 27, 28 and 29.

The operation of the circuit of Figure 1 as shown is as follows: When switch 11 is closed current flows from the D. C. supply through switch 11, choke coil 12, windings 17 and 18 in parallel and the switch contacts connecting said windings in parallel, through vibrator electromagnet 33 to ground through the contacts of switch section 31. This energizes electromagnet 33 thereby attracting reed 32 to engage contact 35. When this occurs electromagnet 33 is shorted out by grounded reed 32 and is thereby demagnetized. Reed 32 swings back engaging contact 34 after which the cycle is repeated.

Electromagnet 33 is of comparatively high resistance so that upon the circuit first becoming energized only a small amount of current flows in the primary windings 17 and 18. However, as soon as the high resistance electromagnet is short-circuited by the reed a low resistance circuit is provided allowing a strong pulse of current to flow in both winding 17 and winding 18 in parallel. Both these windings being similarly polarized, they both co-operate to induce a high voltage across the output of secondary winding 20.

When the reed 32 swings back and engages contact 34 a similar strong pulse of current flows through windings 15 and 16 in parallel. This current being in the opposite direction from that in windings 17 and 18 reverses the polarity of the voltage in secondary winding 20. Thus a high alternating voltage is induced across the output terminals of winding 20.

The ends of winding 20 are connected respectively to the two anodes of a rectifier 38, the cathode of the rectifier being grounded. The center tap of winding 20 is connected to the high voltage output terminal of the system, the other output terminal being grounded. The terminals may preferably comprise contacts of a suitable jack 39 as shown.

A second smaller transformer secondary winding 40 is also provided as shown, the terminals being connected to a pilot lamp 41 to indicate that the system is operating properly.

The connections shown are suitable for use with a six-volt D. C. supply. Since the voltage is comparatively low the transformer windings are connected in parallel to take full advantage of the voltage in energizing the transformer. Likewise the resistances 36 and 37 are shorted out so that the full voltage is applied to electromagnet 33.

Should it be desired to operate the system from a 12 volt supply, the plug 10 is plugged into a 12 volt supply outlet and switch 22 is rotated so that all its movable contacts engage the center stationary contact of each group. It will be observed that windings 15 and 16 are then connected in series between the D. C. source and contact 34, the circuit being as follows: From the center tap of the transformer primary winding through winding 16, contacts 16, contacts of switch section 26, winding 15, contacts of section 24 to contact 34. Primary windings 17 and 18 are similarly connected in series between the D. C. source and contact 35. It will thus be seen that where 12 volts are used just twice the number of transformer primary winding turns are connected in series with the voltage source so that the effect on the transformer secondaries is identical with that obtained with a 6 volt supply when the switch is in the first position. Switch section 31 in this case short-circuits only resistance 37 so that resistance 36 is in series with electromagnet 33 thereby compensating for the increased voltage of the source and effecting the same degree of magnetization of electromagnet 33 as is obtained with the 6 volt supply.

When it is desired to operate from a 32 volt D. C. supply plug 10 is connected to the 32 volt supply and switch 22 is turned to the third or upper switch position. It will be noted that the switch then connects windings 14, 15 and 16 all in series to contact 34, the circuit being as follows: From the center tap of the primary winding through winding 16, contacts of switch section 26, winding 15, winding 14, contacts of switch section 24 to contact 34 of the vibrator. Similarly primary windings 17, 18 and 19 are connected together in series to vibrator contact 35. Windings 14 and 19 respectively add a sufficient number of turns so that the total effect on the transformer of the 32 volt supply is identical with the effect obtained by the 6 and 12 volt supply when the switch is properly set for these voltages. Resistances 36 and 37 are now both connected in series with electromagnet 33 to compensate for the added voltage applied to the electromagnet circuit.

In the secondary circuit a rectifier 38 has been referred to. However, in place of the rectifier this element may comprise additional contacts on the vibrator operated in synchronism with the primary vibrator contacts so that a rectifying effect is obtained in a manner well-known to the prior art.

Timing capacitances 42 and 43 are permanently connected across the primary circuit and the secondary circuit and serve to synchronize the transformer current with the operation of the vibrator. Another method would be to connect timing condenser 42 across the upper contacts of switch sections 24 and 29 (as outlined in previous application) when its effect is constant on all input voltages and switch positions.

Figure 2 shows certain modifications which can be made in the circuit of Figure 1 if desired. If an A. C. output is desired instead of D. C. the rectifier may be eliminated and a simple secondary winding 45 may be used as shown in Figure 2 connected to the two output terminals of jack 46.

If a more elaborate pilot light system is desired the one shown in Figure 2 may be used wherein pilot light supply winding 47 has associated with it three pilot lights 48, 49 and 50 of different colors, such as red, green and blue, together with a switch section 51 mounted on the shaft 30 of switch 22. Thus when switch 22 is set for a 6 volt supply the blue light 50 is illuminated, when the switch is set for a 12 volt supply the green light 49 is energized and when set for a 32 volt supply the red light 48 is used.

The circuit described is suitable for general purposes, for supplying electric razors from various battery supplies and for radio and other power supply uses. The circuit is particularly well adapted for use in trailers and automobiles and in camps and farms where 6 volt batteries and chargers are available. It is also suitable for use in aircraft, small marine craft, buses and the like where 12 volt batteries are standard equipment and it is further adaptable to use on railroads and farms having 32 volt battery supplies.

It will be noted that where a pilot light is used it is independent of the vibrator supply voltage used since it is connected to a secondary winding of the transformer.

When it is desired to change from one voltage supply to another it is merely necessary to turn the knob to the proper switch position for the supply voltage available.

It will be obvious that additional primary windings may be added if desired and connected in series or parallel by the switch as required for the voltage used.

The present circuit is more efficient and desirable than a circuit using a tapped resistance in series with the power supply. The use of a series resistance in the power line contributes to poor operation of the vibrator especially during the "off-contact" interval of the vibrator. At this time, since no current flows in the resistor, the applied voltage rises to the maximum line voltage thereby causes detrimental surges and transients in the vibrator circuits and flaring at the vibrator contacts.

The present invention makes economical use of the transformer since the same core and windings are used in all cases, the two 6 volt windings being used for both 6 and 12 volts and also being connected in series with the additional winding for 32 volt supply.

The circuit is particularly suitable for operation on electric razors which ordinarily require approximately 110 volts at 65 milliamperes either A. C. or D. C. It is preferable to provide a D. C. output since this results in stabilizing the circuit and also in making the circuit more universal. However, as already described A. C. output may be provided.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. An electric power converting system comprising a transformer having a plurality of primary windings and a secondary winding inductively associated with said primary windings, a power output circuit fed by said secondary winding, an automatic periodic current interrupter comprising an electromagnet and a vibratory contact driven thereby, a power input circuit having terminals for connection to any one of a plurality of D. C. power sources of respectively differing voltages, a resistance, and a switch having a plurality of positions, said switch when set in one of its positions connecting at least two of said primary windings in parallel with each other and in a series with said power input terminals and said current interrupter contacts and electromagnet, said switch when set in another of its positions connecting the same primary windings in series with each other and with said power input terminals and said current interrupter contacts and electromagnet and connecting said resistance in series with said electromagnet.

2. An electric power converting system comprising a transformer having a center-tapped primary winding and a secondary winding inductively associated therewith, a power output circuit fed by said secondary winding, an automatic periodic current interrupter comprising a vibratory contact alternately engaging a pair of stationary contacts during vibration thereof and means to vibrate said vibratory contact, a power input circuit having terminals for connection to a D. C. power source, the first of said terminals being connected to the center tap of said primary winding and the second to said vibratory contact, the ends of said primary winding being connected respectively to said stationary contacts, and a second center-tapped primary winding on said transformer similarly inductively associated with said secondary winding and similarly connected to said first terminal and the respective stationary contacts, and a switch for opening the center and end connections of said second center-tapped primary winding and connecting the two sections thereof in series with the two corresponding sections of the first-mentioned center-tapped primary winding, and a pair of additional primary winding sections, on said transformer, said switch including contact means for connecting said additional windings respectively in series with the previously-mentioned series connected sections on the two sides of the center tap respectively for aiding said winding sections.

3. An electric power converting system comprising a transformer having a plurality of primary windings and a secondary winding inductively associated with said primary windings, a power output circuit fed by said secondary winding, an automatic periodic current interrupter, a power input circuit having terminals for connection to any one of a plurality of D. C. power sources of respectively differing voltages, and a switch having a plurality of positions, said switch when set in one of its positions connecting at least two of said primary windings in parallel with each other and in series with said power input terminals and said current interrupter, said switch when set in another of its positions connecting the same primary windings in series with each other and with said power input terminals and said current interrupter, a second secondary winding on said transformer and a plurality of electric current indicators, said switch, in each of its positions connecting a different indicator in the output of said second secondary winding.

4. An electric power converting system comprising a transformer having a center-tapped primary winding and a secondary winding inductively associated therewith, a power output circuit fed by said secondary winding, an automatic periodic current interrupter comprising a vibratory contact alternately engaging a pair of stationary contacts during vibration thereof and means to vibrate said vibratory contact, a power input circuit having terminals for connection to a D. C. power source, the first of said terminals being connected to the center tap of said primary winding and the second to said vibratory contact, the ends of said primary winding being connected respectively to said stationary contacts, and a second center-tapped primary winding on said transformer similarly inductively associated with said secondary winding and similarly connected to said first terminal and the respective stationary contacts, whereby the two sections of said second winding are connected in parallel with the corresponding two sections of the first mentioned winding, and a switch for opening the end connections of the first mentioned center-tapped primary winding and the center and end connections of said second center-tapped primary winding, and connecting the two sections of said second secondary winding in series with the two corresponding sections of the first-mentioned center-tapped primary winding.

THEODORE N. ROSSER.